(12) United States Patent
Ye

(10) Patent No.: US 8,934,346 B2
(45) Date of Patent: Jan. 13, 2015

(54) APPARATUSES AND METHODS FOR HANDLING RANDOM ACCESS PROCEDURES

(71) Applicant: Acer Incorporated, Taipei Hsien (TW)

(72) Inventor: Shiang-Rung Ye, Taipei Hsien (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 84 days.

(21) Appl. No.: 13/686,230

(22) Filed: Nov. 27, 2012

(65) Prior Publication Data

US 2013/0242891 A1    Sep. 19, 2013

Related U.S. Application Data

(60) Provisional application No. 61/611,758, filed on Mar. 16, 2012.

(51) Int. Cl.
*H04L 1/00*    (2006.01)
*H04W 74/08*    (2009.01)
*H04W 74/00*    (2009.01)

(52) U.S. Cl.
CPC ........ *H04W 74/0833* (2013.01); *H04W 74/002* (2013.01)
USPC .......................................... 370/236; 370/229

(58) Field of Classification Search
USPC ......... 370/329, 330, 331, 334, 335, 336, 337, 370/341, 338, 339, 344
See application file for complete search history.

(56) References Cited

U.S. PATENT DOCUMENTS

2012/0281680 A1* 11/2012 Bostrom et al. ............... 370/336
2013/0336298 A1* 12/2013 Dinan ........................... 370/336

FOREIGN PATENT DOCUMENTS

EP    2557885 A1    2/2013

OTHER PUBLICATIONS

"Release of PUCCH Resources and Removal of SCell Configuration"; InterDigital Communications; Madrid, Spain, Aug. 23-27, 2010; pp. 1-11.
"Simultaneous Transmissions in Multiple TA Groups"; LG Electronics; Dresden, Germany, Feb. 6-10, 2012; pp. 1-9.
EP Search Report dated Jun. 26, 2014.
"Configuration of Multiple TA in Rel-11 CA"; Intel Corporation; Barcelona, Spain, May 9-13, 2011; pp. 1-5.

* cited by examiner

*Primary Examiner* — Dady Chery
(74) *Attorney, Agent, or Firm* — McClure, Qualey & Rodack, LLP

(57) ABSTRACT

A cellular station with a wireless module and a controller module is provided for handling random access procedures in a multi-carrier system. The wireless module performs wireless transceiving to and from a mobile communication device on a first SCell and a second SCell of a timing reference group. The controller module waits for a predetermined period of time subsequent to an expiry of a deactivation timer for the first SCell maintained in the cellular station, and transmits, to the mobile communication device via the wireless module, a PDCCH order for initiating a random access procedure on the second SCell or an activation command for activating the first SCell, in response to the predetermined period of time being elapsed.

4 Claims, 4 Drawing Sheets

APPARATUSES AND METHODS FOR HANDLING RANDOM ACCESS PROCEDURES

CROSS REFERENCE TO RELATED APPLICATIONS

This Application claims priority of U.S. Provisional Application No. 61/611,758, filed on Mar. 16, 2012, the entirety of which is incorporated by reference herein.

BACKGROUND OF THE INVENTION

1. Field of the Invention

The invention generally relates to the techniques for handling random access procedures, and more particularly, to apparatuses, systems, and methods for handling random access procedures in a multi-carrier system.

2. Description of the Related Art

In order to meet user demands for higher data rates in wireless communications, support for wider transmission bandwidths is required. A so-called Carrier Aggregation (CA) technique has been proposed to allow for the expansion of effective bandwidth delivered to a user terminal through concurrent utilization of radio resources across multiple carriers. The CA technique is most useful when it is difficult to derive a contiguous and extra wide bandwidth. With the CA technique, 2 or more frequency bands may be aggregated to form a larger transmission/receive bandwidth. Each of the aggregated frequency bands is generally referred to as a carrier frequency.

Specifically, each carrier frequency needs to be configured and activated before it may be used for data transmission or reception. The network side may first transmit a Radio Resource Control (RRC) message to configure the carrier frequencies for a User Equipment (UE) (or may be referred to as a Mobile Station (MS)), and then transmit a Medium Access Control (MAC) activation command to the UE to activate one of the carrier frequencies. After that, the UE may initiate a random access procedure on the activated carrier frequency for uplink timing alignment, requesting radio resources, or other purposes. However, if a UE is configured with more than one carrier frequency, there may be a situation where multiple random access procedures are requested to be performed on different carrier frequencies at the same time for the UE. However, in some radio access technologies, such as the Long Term Evolution (LTE) technology, only one random access procedure is allowed to be performed at a given time for a UE. As a result, confusion regarding which one of the random access procedures should be performed first may occur, which causes indeterminate behavior or even malfunction of the UE.

BRIEF SUMMARY OF THE INVENTION

The invention proposes solutions for the UE (referred to herein as mobile communication device) to solve the confusion regarding which random access procedure should be performed first among a plurality of requested random access procedures.

In one aspect of the invention, a mobile communication device comprising a wireless module and a controller module is provided for handling random access procedures in a multi-carrier system. The wireless module performs wireless transceiving to and from a cellular access network comprising a first SCell and a second SCell of a timing reference group. The controller module waits for a predetermined period of time subsequent to an expiry of a deactivation timer for the first SCell maintained in the cellular station, and transmits, to the mobile communication device via the wireless module, a PDCCH order for initiating a random access procedure on the second SCell or an activation command for activating the first SCell, in response to the predetermined period of time being elapsed.

In another aspect of the invention, a method for a cellular station comprising a first SCell and a second SCell of a timing reference group to handle a random access procedure with a mobile communication device is provided. The method comprises the steps of waiting for a predetermined period of time subsequent to an expiry of a deactivation timer for the first SCell maintained in the cellular station, and transmitting, to the mobile communication device, a PDCCH order for initiating a random access procedure on the second SCell or an activation command for activating the first SCell, in response to the predetermined period of time being elapsed.

Other aspects and features of the invention will become apparent to those with ordinary skill in the art upon review of the following descriptions of specific embodiments of the mobile communication devices and methods for handling random access procedures.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
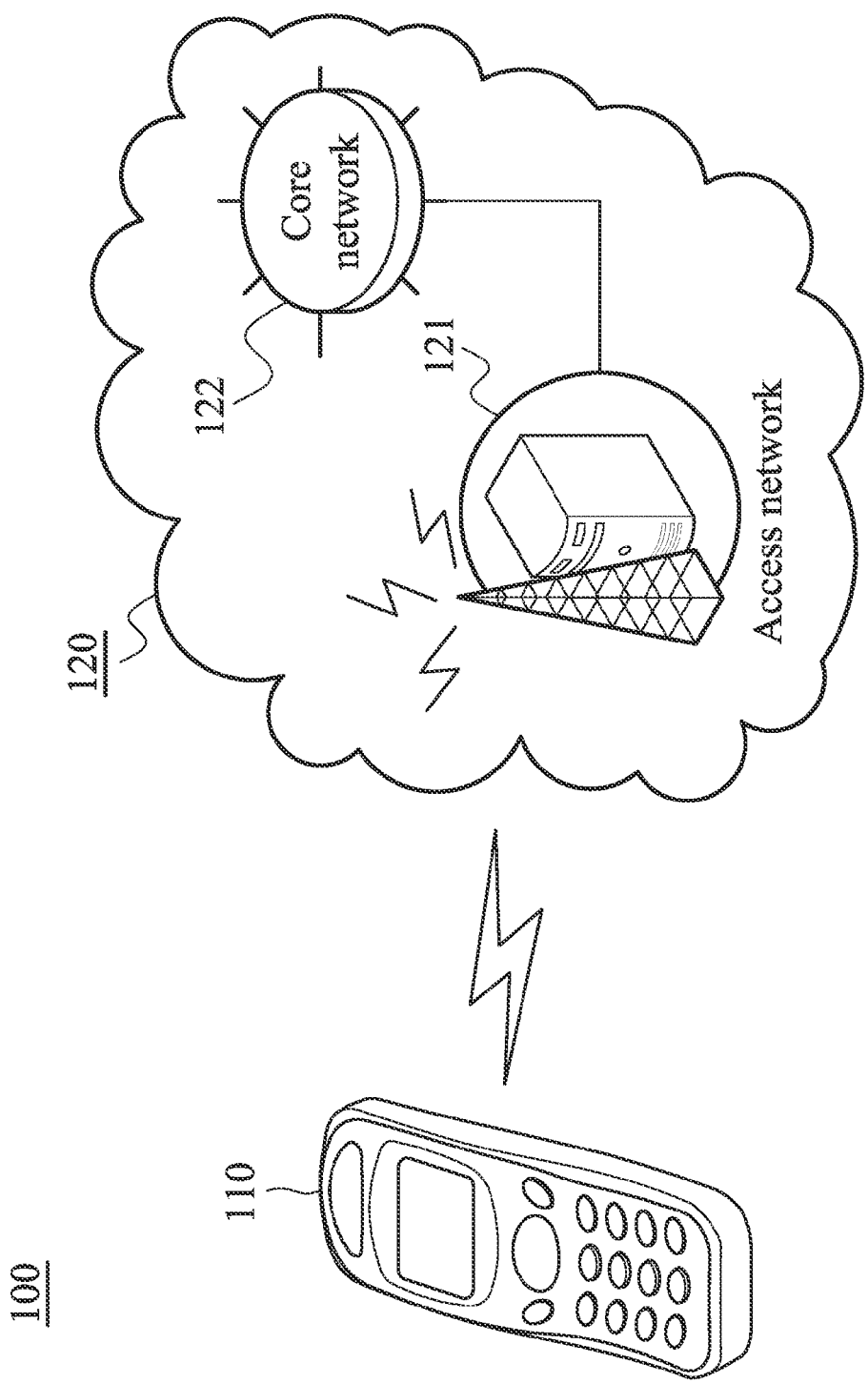
FIG. 1 is a block diagram illustrating a multi-carrier system according to an embodiment of the invention.

FIG. 1 is a block diagram illustrating a multi-carrier system according to an embodiment of the invention. In the multi-carrier system 100, the mobile communication device 110 is wirelessly connected to the service network 120 via the air interface for obtaining wireless services, wherein both of the mobile communication device 110 and the service network 120 support CA technique and multiple carrier frequencies. The service network 120 comprises at least one cellular access network 121 and the core network 122. In general, the cellular access network 121 is controlled by the core network 122 to provide the functionality of wireless transceiving, and the cellular access network 121 may comprise one or more cellular stations, such as base stations, Node-Bs, or evolved Node-B (eNB), depending on the radio access technology in use. Although not shown, the core network 122 may further enable interfacing with external networks, such as the Public Switched Telephone Network (PSTN), which is called the Circuit Switched (CS) domain functionality, or interfacing with the Internet Protocol (IP) based Network, such as the Internet, which is called the Packet Switched (PS) domain functionality.

Each cellular station in the cellular access network 121 may comprise a wireless module (not shown) and a controller module (not shown), wherein the wireless module is configured to perform the functionality of wireless transceiving for the service network 120 and the controller module is configured to control the operation of the wireless module. To further clarify, the wireless module may be a Radio Frequency (RF) unit (not shown), and the controller module may be a general-purpose processor or Micro-Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 2100 MHz, or 2.6 GHz utilized in LTE/LTE-Advanced technology, or others depending on the radio access technology in use. In addition, each cellular station may further comprise other functional components, such as a display unit and/or keypad serving as the Man-Machine Interface (MMI), a storage unit storing the program codes of applications, or others.

Since each carrier frequency supported by the cellular access network 121 (i.e., the cellular station of the cellular access network 121) forms a separate cell with its own cell ID, the mobile communication device 110 may connect to one Primary Serving Cell (referred to herein as PCell) and up to 4 or more Secondary Serving Cells (referred to herein as SCells) depending on the radio access technology in use. The PCell is defined as the cell which is initially configured during connection establishment, while the SCells are cells which may be configured after connection establishment for providing additional radio resources. Note that, the random access procedures in the invention are performed on the SCells.

In one embodiment, the service network 120 may be an LTE network, the cellular access network 121 may be an Evolved Universal Terrestrial Radio Access Network (E-UTRAN) which comprises at least one eNB, and the core network 122 may be an Evolved Packet Core (EPC), while the mobile communication device 110 may be a UE or MS which utilizes the LTE technology. Please note that, in other embodiments, instead of the LTE technology, other radio access technologies which support the CA technique and multiple carrier frequencies, such as the LTE-Advanced technology, the Worldwide Interoperability for Microwave Access (WiMAX) technology, and others, may be utilized by the service network 120 and the mobile communication device 110, and the invention is not limited thereto.

Figure 2:
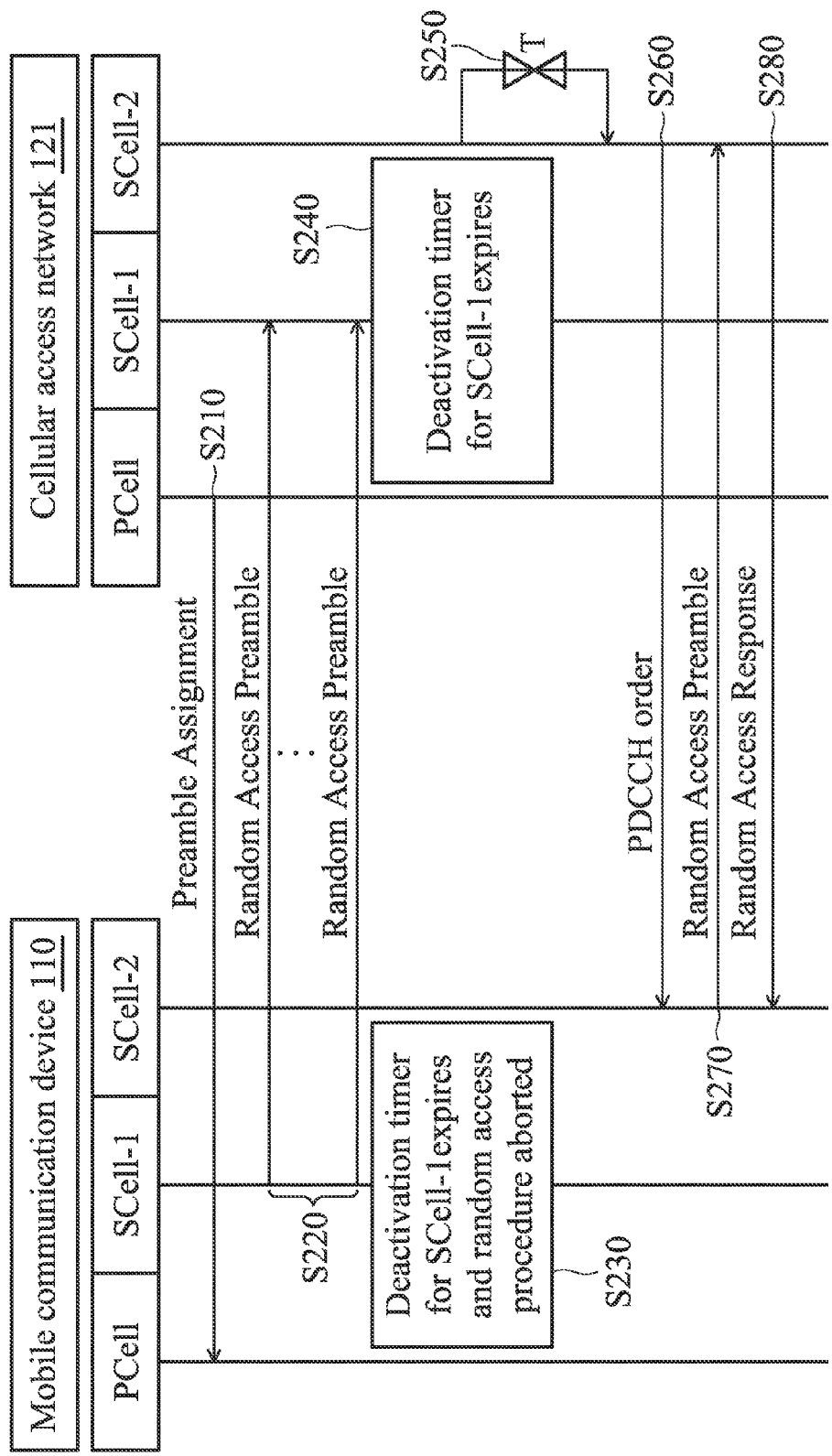
FIG. 2 is a message sequence chart illustrating the handling of random access procedures according to an embodiment of the invention.

FIG. 2 is a message sequence chart illustrating the handling of random access procedures according to an embodiment of the invention. In this embodiment, the cellular access network 121 is an E-UTRAN supporting three or more carrier frequencies which form one PCell and two SCells of the same secondary Timing Advanced Group (sTAG), and the mobile communication device 110 is a UE utilizing the LTE technology or LTE-Advanced technology. Particularly, the mobile communication device 110 is initially connected to the PCell and SCells of the cellular access network 121, and receives a Preamble Assignment message from the cellular access network 121 on the PCell (step S210). In this embodiment, the random access procedure on the SCell-1 is a non-contention based random access procedure. Specifically, the cellular access network 121 may transmit an RRC message, such as an RRC Connection Reconfiguration message, to the mobile communications device 110 to configure the connection to the PCell and Scells, and the Preamble Assignment message is transmitted via the DL-SCH, which contains an assigned preamble for the mobile communication device 110. Next, the mobile communication device 110 initiates a random access procedure on one SCell (denoted as SCell-1) by transmitting a Random Access Preamble message via the P-RACH using the assigned preamble (step S220). However, in this embodiment, no response to the Random Access Preamble message is received from the cellular access network 121, and the mobile communication device 110 retransmits the Random Access Preamble message each time a guard timer for the random access procedure expires, until the deactivation timer for the SCell-1 maintained in the mobile communication device 110 expires and the random access procedure is aborted (step S230). In one embodiment, the step S220 may be performed in response to receiving a PDCCH order (not shown) which indicates that the mobile communication device 110 is to initiate the random access procedure on the SCell-1, or the step S220 may be performed by the mobile communication device 110 spontaneously.

Note that, the transmission of the Random Access Preamble message may not be successful due to bad signal quality of the SCell-1, and no response is received due to the cellular access network 121 not receiving the Random Access Preamble message. Since the cellular access network 121 does not receive the Random Access Preamble message from the mobile communication device 110 and the deactivation timer for the SCell-1 maintained in the cellular access network 121 has expired (step S240), it further waits for a predetermined period of time (denoted as T) before transmitting a PDCCH order for initiating a random access procedure on another SCell (denoted as SCell-2) or an activation command for activating the SCell-1 (step S250). Note that, the waiting for the predetermined period of time ensures that the deactivation timer for the SCell-1 maintained in the mobile communication device 110 has expired and the PDCCH order is not transmitted during an ongoing random access procedure on the SCell-1.

Later, in response to the predetermined period of time being elapsed, the cellular access network 121 transmits a PDCCH order to the mobile communication device 110 for initiating a random access procedure on the SCell-2 (step S260). Specifically, the initiated random access procedure on the SCell-2 is a non-contention based random access procedure. When receiving the PDCCH order, the mobile communication device 110 transmits a Random Access Preamble message to the cellular access network 121 on the SCell-2 via the P-RACH (step S270). Next, the mobile communication device 110 receives a Random Access Response message on the SCell-2 from the cellular access network 121 (step S280), and the procedure ends. Specifically, the Random Access Response message is transmitted via the DL-SCH, which contains timing advance information for uplink timing alignment of the mobile communication device 110.

Figure 3:
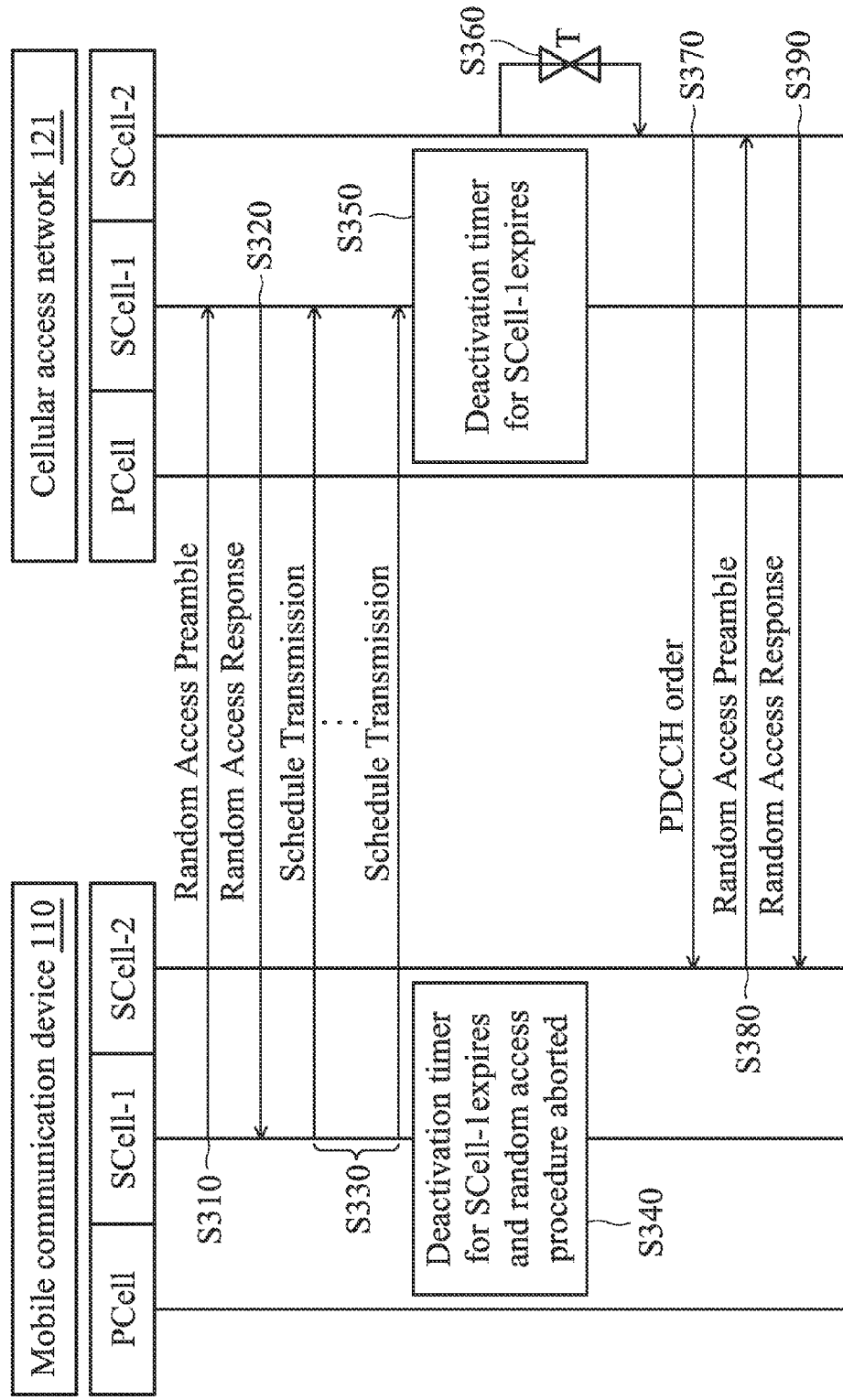
FIG. 3 is a message sequence chart illustrating the handling of random access procedures according to another embodiment of the invention.

FIG. 3 is a message sequence chart illustrating the handling of random access procedures according to another embodiment of the invention. Similar to FIG. 2, the cellular access network 121 is an E-UTRAN supporting three or more carrier frequencies which form one PCell and two SCells of the same sTAG, and the mobile communication device 110 is a UE utilizing the LTE technology or LTE-Advanced technology. Particularly, the mobile communication device 110 is initially connected to the PCell and SCells of the cellular access network 121. In one embodiment, the cellular access network 121 may transmit an RRC message, such as an RRC Connection Reconfiguration message, to the mobile communications device 110 to configure the connection to the PCell and Scells. To begin, the mobile communication device 110 initiates a random access procedure on one SCell (denoted as SCell-1) by transmitting a Random Access Preamble message via the P-RACH (step S310). In this embodiment, the random access procedure on the SCell-1 is a contention based random access procedure, and the mobile communication device 110 selects one of a plurality of P-RACH configurations for the transmission of the Random Access Preamble message, which may be provided to the mobile communication device 110 prior to the initiation of the random access procedure. In reply, the cellular access network 121 transmits a Random Access Response message to the mobile communication device 110 (step S320). Specifically, the Random Access Response message is transmitted via the DL-SCH, which contains timing advance information for uplink timing alignment, an uplink grant, and a temporary C-RNTI for the mobile communication device 110. Subsequently, the mobile communication device 110 uses the uplink grant for Schedule Transmission to the cellular access network 121 along with the temporary C-RNTI (step S330).

However, in this embodiment, no response to the Schedule Transmission is received from the cellular access network 121, and the mobile communication device 110 retries the Schedule Transmission each time a guard timer for the random access procedure expires, until the deactivation timer for the SCell-1 maintained in the mobile communication device 110 expires and the random access procedure is aborted (step S340). Note that, the Schedule Transmission may not be successful due to bad signal quality of the SCell-1, and no response would be received due to the cellular access network 121 not receiving the Schedule Transmission. Since the cellular access network 121 does not receive the Schedule Transmission from the mobile communication device 110 and the deactivation timer for the SCell-1 maintained in the cellular access network 121 has expired (step S350), the cellular access network 121 further waits for a predetermined period of time (denoted as T) before transmitting a PDCCH order for initiating a random access procedure on another SCell (denoted as SCell-2) or an activation command for activating the SCell-1 (step S360). Note that, the waiting for the predetermined period of time ensures that the deactivation timer for the SCell-1 maintained in the mobile communication device 110 has expired and the PDCCH order is not transmitted during an ongoing random access procedure on the SCell-1.

Later, in response to the predetermined period of time being elapsed, the cellular access network 121 transmits a PDCCH order to the mobile communication device 110 for initiating a random access procedure on the SCell-2 (step S370). Specifically, the initiated random access procedure on the SCell-2 is a non-contention based random access procedure. When receiving the PDCCH order, the mobile communication device 110 transmits a Random Access Preamble message to the cellular access network 121 on the SCell-2 via the P-RACH (step S380). Next, the mobile communication device 110 receives a Random Access Response message on the SCell-2 from the cellular access network 121 (step S390), and the procedure ends. Specifically, the Random Access Response message in the step S390 is transmitted via the DL-SCH, which contains timing advance information for uplink timing alignment of the mobile communication device 110.

Alternatively, the mobile communication device 110 may not receive any response to the Random Access Preamble message transmitted in the step S310, before the deactivation timer for the SCell-1 maintained in the mobile communication device 110 expires and the random access procedure is aborted. That is, the mobile communication device 110 may retry the step S310 before the expiry of the deactivation timer for the SCell-1 maintained in the mobile communication device 110.

Figure 4:
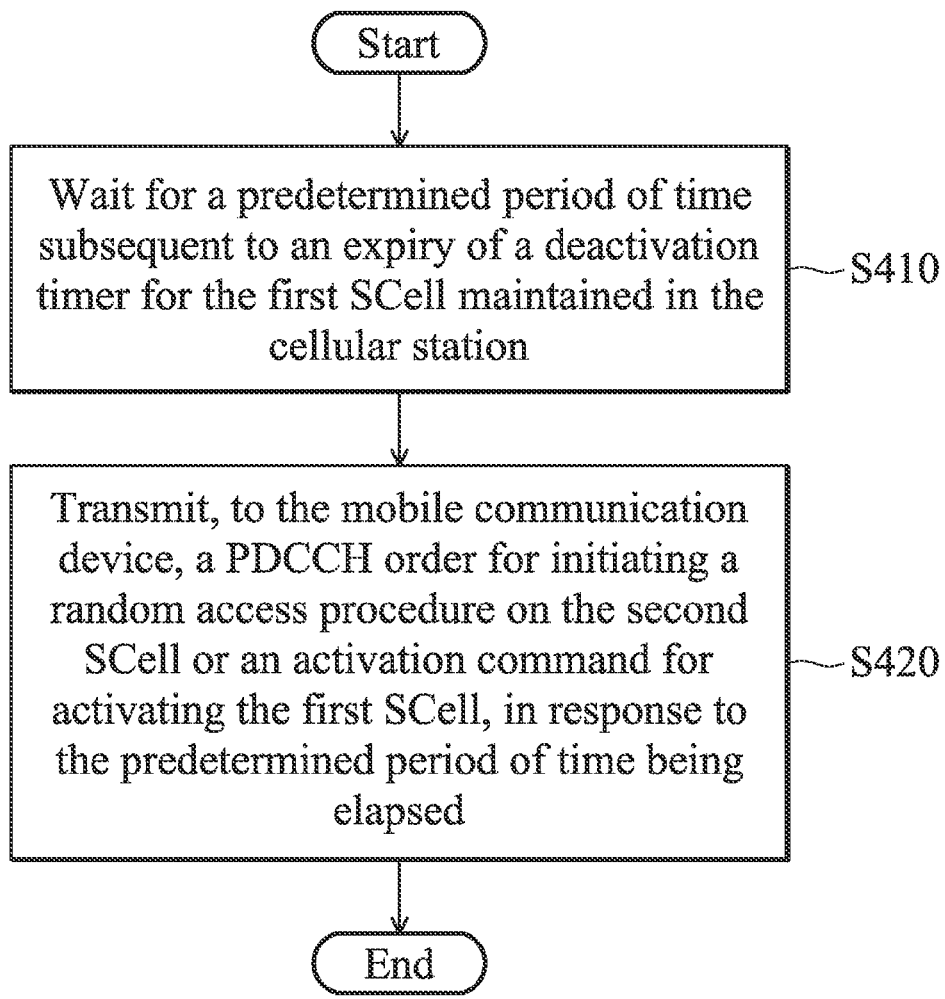
FIG. 4 is a flow chart illustrating a method for handling random access procedures in the MAC layer according to an embodiment of the invention.

FIG. 4 is a flow chart illustrating a method for handling random access procedures in the MAC layer according to an embodiment of the invention. The method may be applied to any cellular station supporting the CA technique and multiple carrier frequencies, such as an eNB in the LTE/LTE-Advanced technology. Specifically, in this embodiment, the cellular station supports at least 3 carrier frequencies forming a PCell and 2 SCells of the same sTAG which are wirelessly connected to by a mobile communication device. To begin, the cellular station waits for a predetermined period of time subsequent to an expiry of a deactivation timer for the first SCell maintained in the cellular station (step S410). Since the deactivation timers for the first SCell maintained in the cellular station and the mobile communication device may not run in sync (as they are supposed to be), due to the system timing kept in both sides possibly being different, the waiting for the predetermined period of time may ensure the expiry of the deactivation timer for the first SCell maintained in the mobile communication device.

Subsequently, the cellular station transmits, to the mobile communication device, a PDCCH order for initiating a random access procedure on the second SCell or an activation command for activating the first SCell, in response to the predetermined period of time being elapsed (step S420). Thus, the expiry of the deactivation timer for the first SCell maintained in the mobile communication device may ensure that the PDCCH order is not transmitted during an ongoing random access procedure on the first SCell, and the collision of multiple random access procedures on different SCells may be avoided.

While the invention has been described by way of example and in terms of preferred embodiment, it is to be understood that the invention is not limited thereto. Those who are skilled in this technology can still make various alterations and modifications without departing from the scope and spirit of this invention. For example, the methods for handling random access procedures may also be applied for any evolutionary technology of the LTE/LTE-Advanced technology family or other radio access technologies which support CA technique and multiple carrier frequencies. Therefore, the scope of the invention shall be defined and protected by the following claims and their equivalents.

What is claimed is:

1. A cellular station for handling random access procedures in a multi-carrier system, comprising:
   a wireless module, performing wireless transceiving to and from a mobile communication device on a first SCell and a second SCell of a timing reference group; and
   a controller module, waiting for a predetermined period of time subsequent to an expiry of a deactivation timer for the first SCell maintained in the cellular station, and transmitting, to the mobile communication device via the wireless module, a PDCCH order for initiating a random access procedure on the second SCell or an activation command for activating the first SCell, in response to the predetermined period of time being elapsed, wherein the waiting for the predetermined period of time ensures that another deactivation timer for the first SCell maintained in the mobile communication device has expired and wherein the expiry of another deactivation timer for the first SCell maintained in the mobile communication device further ensures that the PDCCH order is not transmitted during an ongoing random access procedure on the first SCell.

2. The cellular station of claim 1, wherein the wireless module and the controller module operate in compliance with the Long Term Evolution (LTE) technology or LTE-Advanced technology.

3. A method for a cellular station comprising a first SCell and a second SCell of a timing reference group to handle a random access procedure with a mobile communication device, the method comprising:

waiting for a predetermined period of time subsequent to an expiry of a deactivation timer for the first SCell maintained in the cellular station, thereby ensuring that another deactivation timer for the first SCell maintained in the mobile communication device has expired, wherein the expiry of another deactivation timer for the first SCell maintained in the mobile communication device further ensures that the PDCCH order is not transmitted during an ongoing random access procedure on the first SCell; and transmitting, to the mobile communication device, a PDCCH order for initiating a random access procedure on the second SCell or an activation command for activating the first SCell, in response to the predetermined period of time being elapsed.

4. the method of claim 3, wherein the cellular station operates in compliance with the Long Term Evolution (LTE) technology or LTE-Advanced technology.

\* \* \* \* \*